(12) United States Patent
Nishiyama et al.

(10) Patent No.: US 10,268,039 B2
(45) Date of Patent: Apr. 23, 2019

(54) VIBRATION DEVICE AND CAMERA

(71) Applicant: Murata Manufacturing Co., Ltd., Nagaokakyo-shi, Kyoto-fu (JP)

(72) Inventors: Kenji Nishiyama, Nagaokakyo (JP); Katsumi Fujimoto, Nagaokakyo (JP); Masanobu Nomura, Nagaokakyo (JP); Shinsuke Ikeuchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/933,501

(22) Filed: Mar. 23, 2018

(65) Prior Publication Data

US 2018/0210194 A1    Jul. 26, 2018

Related U.S. Application Data

(63) Continuation of application No. PCT/JP2016/086934, filed on Dec. 12, 2016.

(30) Foreign Application Priority Data

Dec. 25, 2015   (JP) ................................. 2015-252851

(51) Int. Cl.
  *B06B 1/06*   (2006.01)
  *B06B 3/00*   (2006.01)
  (Continued)

(52) U.S. Cl.
  CPC ............ *G02B 27/0006* (2013.01); *B06B 1/06* (2013.01); *B06B 3/00* (2013.01); *G03B 17/08* (2013.01);
  (Continued)

(58) Field of Classification Search
  CPC ...... G03B 17/02; G03B 19/04; H04N 5/2254; G02B 13/004; G02B 27/0006
  (Continued)

(56) References Cited

U.S. PATENT DOCUMENTS 4,131,874 A * 12/1978 Geohegan, Jr. ........ B06B 1/0603
310/337
4,156,156 A * 5/1979 Sweany ................. G10K 9/122
29/25.35

(Continued)

FOREIGN PATENT DOCUMENTS

JP   03-244281 A   10/1991
JP   2003-333395 A  11/2003
(Continued)

OTHER PUBLICATIONS

Official Communication issued in International Patent Application No. PCT/JP2016/086934, dated Feb. 7, 2017.

*Primary Examiner* — Clayton E. LaBalle
*Assistant Examiner* — Kevin C Butler
(74) *Attorney, Agent, or Firm* — Keating & Bennett, LLP

(57) ABSTRACT

A vibration device includes a support body that includes first and second principal surfaces and a through hole penetrating through the support body to open at the first and second principal surfaces, a first vibration element on the side of the first principal surface of the support body, and a second vibration element on the side of the second principal surface of the support body. The first vibration element includes a first vibration body that is translucent. The second vibration element includes a second vibration body and a second piezoelectric vibrator provided on the second vibration body.

18 Claims, 6 Drawing Sheets

US 10,268,039 B2
Page 2

(51) Int. Cl.
  *G02B 27/00* (2006.01)
  *G03B 17/08* (2006.01)
  *G03B 17/56* (2006.01)
  *H04N 5/225* (2006.01)

(52) U.S. Cl.
  CPC ........... *G03B 17/56* (2013.01); *H04N 5/2254* (2013.01); *H04N 5/22521* (2018.08); *G03B 2205/0061* (2013.01)

(58) Field of Classification Search
  USPC .......................................................... 396/439
  See application file for complete search history.

(56) References Cited

U.S. PATENT DOCUMENTS

| | | | | | |
|---|---|---|---|---|---|
| 4,173,725 | A | * | 11/1979 | Asai ...................... | B06B 1/0618 310/325 |
| 4,302,695 | A | * | 11/1981 | Boyles ................... | H04R 17/00 310/322 |
| 4,330,729 | A | * | 5/1982 | Byrne .................... | H04R 17/10 310/322 |
| 4,647,336 | A | * | 3/1987 | Coenen ................... | B06B 3/00 116/137 A |
| 4,786,836 | A | * | 11/1988 | Tokushima ............ | G11B 15/18 310/12.27 |
| 5,339,051 | A | * | 8/1994 | Koehler ............... | H03H 9/1035 310/318 |
| 5,763,983 | A | * | 6/1998 | Huang .................. | H01L 41/107 310/358 |
| 6,087,760 | A | * | 7/2000 | Yamaguchi ............ | G01B 17/00 310/328 |
| 6,628,177 | B2 | * | 9/2003 | Clark ..................... | H03H 3/007 310/309 |
| 2003/0214599 | A1 | | 11/2003 | Ito et al. | |
| 2008/0013945 | A1 | * | 1/2008 | Takizawa .............. | H04N 5/2253 396/439 |
| 2012/0243093 | A1 | * | 9/2012 | Tonar .................. | H01L 41/0973 359/507 |
| 2015/0171309 | A1 | * | 6/2015 | Kubota ................. | H01L 41/083 347/68 |
| 2015/0304528 | A1 | * | 10/2015 | Shimizu ............... | H04N 5/2251 348/374 |
| 2017/0150022 | A1 | * | 5/2017 | Shigemitsu ............ | G02B 7/04 |
| 2018/0031826 | A1 | * | 2/2018 | Fedigan .............. | G02B 27/0006 |
| 2018/0188526 | A1 | * | 7/2018 | Li ....................... | G02B 27/0006 |

FOREIGN PATENT DOCUMENTS

| | | | | |
|---|---|---|---|---|
| JP | 3137328 | * | 11/2007 | ............. G03B 11/04 |
| JP | 3137328 U | | 11/2007 | |
| JP | 2008-028615 A | | 2/2008 | |
| JP | 2008028615 | * | 2/2008 | ............. G03B 11/00 |
| JP | 2010-181584 A | | 8/2010 | |
| JP | 2010181584 | * | 8/2010 | ............. G02B 7/02 |
| JP | 2010-271435 A | | 12/2010 | |
| JP | 2010271435 | * | 12/2010 | ............. G03B 17/02 |
| JP | 2012-138768 A | | 7/2012 | |

* cited by examiner

VIBRATION DEVICE AND CAMERA

CROSS REFERENCE TO RELATED APPLICATIONS

This application claims the benefit of priority to Japanese Patent Application No. 2015-252851 filed on Dec. 25, 2015 and is a Continuation Application of PCT Application No. PCT/JP2016/086934 filed on Dec. 12, 2016. The entire contents of each application are hereby incorporated herein by reference.

BACKGROUND OF THE INVENTION

1. Field of the Invention

The present invention relates to vibration devices and cameras including piezoelectric vibrators.

2. Description of the Related Art

Various mechanisms for removing water droplets, such as raindrops, have been proposed for conventional cameras. In the camera with a raindrop removal function described in Japanese Unexamined Patent Application Publication No. 2012-138768, a dome type lens cover is arranged in front of the camera body. A cylindrical tube portion is joined to the lens cover. A piezoelectric vibrator is fixed to the inside surface of the cylindrical tube portion. The piezoelectric vibrator vibrates the cylindrical tube portion and the lens cover. The water droplets that adhere to the lens cover are removed accordingly.

In the camera with a raindrop removal function according to Japanese Unexamined Patent Application Publication No. 2012-138768, the sealability in a joint portion between the lens cover and the cylindrical tube portion needs to be sufficiently improved so as to enhance the reliability of the camera body. Since the above-described joint portion vibrates, the strength of the junction is improved mostly by increasing the width of the above-described joint portion. In this case, however, the vibration for removing water droplets is easily inhibited. Thus, in attempting to improve the reliability of the camera body, there is a possibility that the water droplets that adhere to the lens cover fail to be sufficiently removed. It is further necessary to remove not only water droplets but also, for example, a solution other than water, such as ethanol, an aqueous solution in which salt, an antifreezing agent (calcium chloride), or the like is dissolved, droplets including impurities that do not dissolve in water, such as muddy water, or a colloid solution, such as coffee.

SUMMARY OF THE INVENTION

Preferred embodiments of the present invention provide vibration devices and cameras that are capable of improving the reliability of a camera body and sufficiently removing water droplets and other matter that adhere to a lens cover.

A vibration device according to a preferred embodiment of the present invention includes a support body that includes one principal surface and another principal surface and a through hole penetrating through the support body to open at the one principal surface and the another principal surface, a first vibration element arranged on a side of the one principal surface of the support body, and a second vibration element located on a side of the another principal surface of the support body, the first vibration element including a first vibration body that is at least translucent, the second vibration element including a second vibration body and a piezoelectric vibrator provided on the second vibration body.

In a vibration device according to a preferred embodiment of the present invention, the support body supports the first vibration element and the second vibration element in a node of vibration of the first vibration element and the second vibration element.

In a vibration device according to a preferred embodiment of the present invention, the support body supports the first vibration element and the second vibration element on outside edges of the first vibration element and the second vibration element.

In a vibration device according to a preferred embodiment of the present invention, the first vibration element includes a first piezoelectric vibrator provided on the first vibration body and the piezoelectric vibrator of the second vibration element is a second piezoelectric vibrator, and the first piezoelectric vibrator and the second piezoelectric vibrator vibrate with mutually opposite phases. In this case, the first vibration element, the second vibration element, and the support body define a buckling tuning fork vibrator. Thus, the reliability of the camera body is able to be further improved, and water droplets and other matter that adhere to the lens cover are more effectively removed.

In a vibration device according to a preferred embodiment of the present invention, the support body has a tubular shape.

In a vibration device according to a preferred embodiment of the present invention, the first vibration element includes a plurality of vibration regions and adjacent vibration regions in the plurality of vibration regions vibrate with opposite phases. In this case, a portion of the first vibration element at which water droplets and other matter are removed may be changed as desired.

In a vibration device according to a preferred embodiment of the present invention, the first vibration body has a plate shape.

In a vibration device according to a preferred embodiment of the present invention, the first vibration body has a dome shape.

In a vibration device according to a preferred embodiment of the present invention, the second vibration body is translucent and has a plate shape.

In a vibration device according to a preferred embodiment of the present invention, the second vibration body includes a cavity and an extension portion that extends from the cavity to a side opposite to a side on which the first vibration element is provided.

In a vibration device according to a preferred embodiment of the present invention, a casing member connected to the support body is further included, and the first vibration element, the support body, and the casing member define an accommodation space. In this case, the camera body is able to be accommodated in the accommodation space.

In a camera according to a preferred embodiment of the present invention, the vibration device according to a preferred embodiment of the present invention, a lens module accommodated in the accommodation space, and an imaging element accommodated in the accommodation space are provided.

In a camera according to a preferred embodiment of the present invention, a lens module that includes a vibration device according to a preferred embodiment of the present invention and a lens, and an imaging element are provided, and at least one of the first vibration element and the second vibration element of the vibration device includes the lens.

Preferred embodiments of the present invention provide vibration devices and cameras capable of improving the reliability of a camera body and sufficiently removing water droplets and other matter that adhere to a lens cover.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
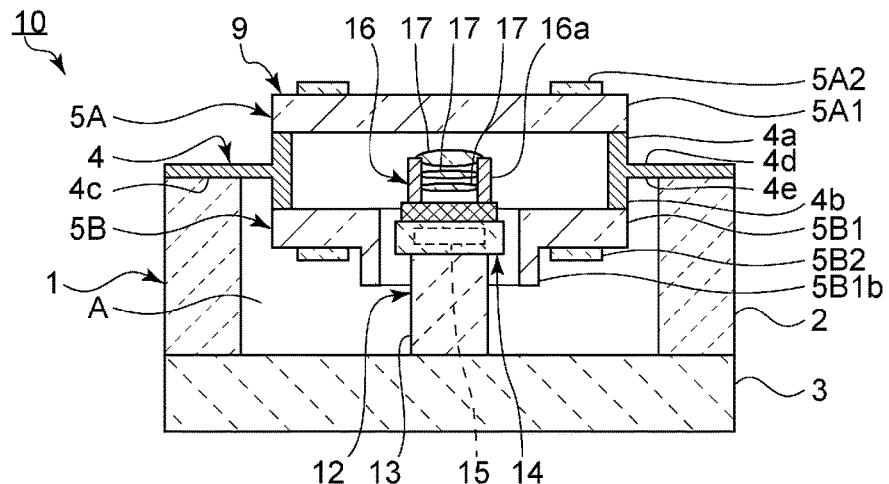
FIG. 1 is a front cross-sectional view of a camera according to a first preferred embodiment of the present invention.

The present invention is clarified below by describing specific preferred embodiments of the present invention while referring to the drawings.

It should be pointed out that each of the preferred embodiments described herein is an example and among different preferred embodiments, partial replacements or combinations of elements and/or features are possible.

Figure 2:
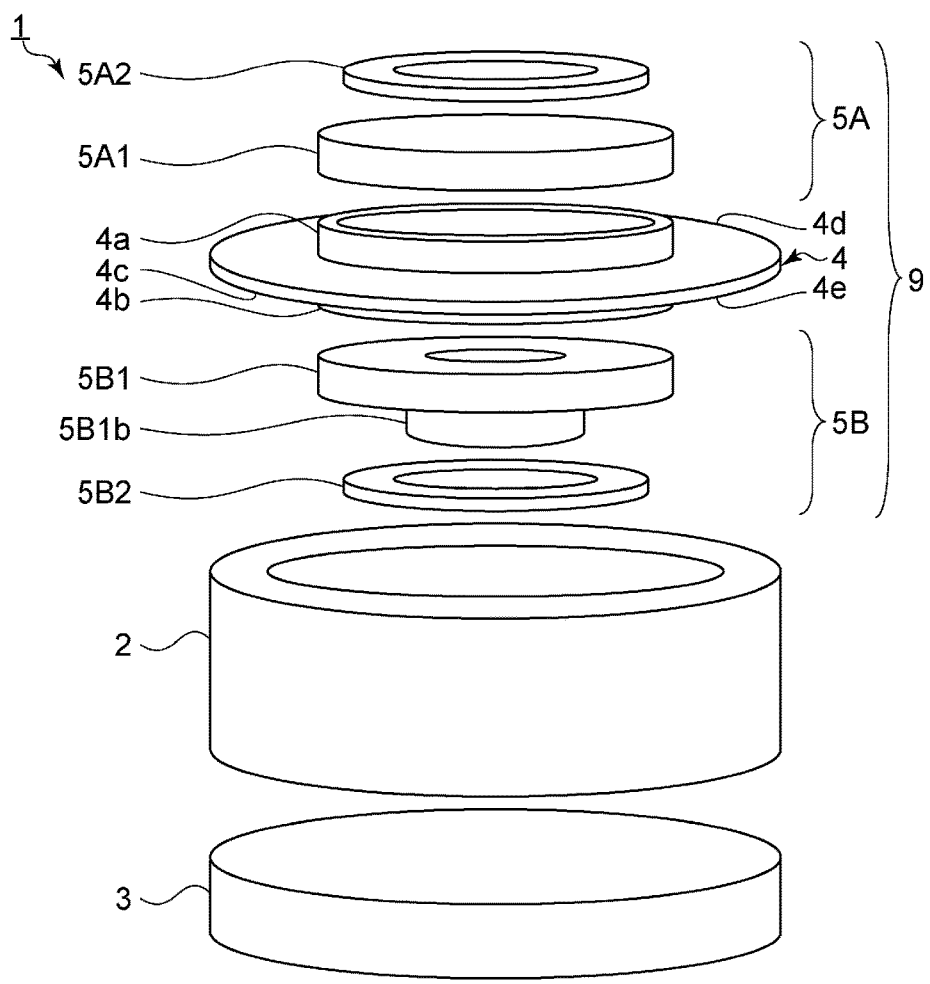
FIG. 2 is an exploded perspective view of a vibration device according to the first preferred embodiment of the present invention.

FIG. 1 is a front cross-sectional view of a camera according to a first preferred embodiment of the present invention. FIG. 2 is an exploded perspective view of a vibration device according to the first preferred embodiment.

As illustrated in FIG. 1, a camera 10 includes a vibration device 1. In the vibration device 1, a camera body 12 is accommodated. The camera 10 has a height direction that corresponds to the upper side and the lower side of FIG. 1. The upper side and the lower side herein represent the upper side and the lower side in the above-described height direction.

The camera body 12 includes a body member 13. The lower end of the body member 13 is fixed to a base plate 3. An imaging portion 14 is fixed to the upper end of the body member 13. In the imaging portion 14, a circuit 15 that includes an imaging element is included. A lens module 16 is fixed so as to face the imaging portion 14. The lens module 16 includes an outside wall portion 16a. Inside the outside wall portion 16a, a plurality of lenses 17 are provided.

The structure of the above-described camera body 12 is not particularly limited as long as the structure enables an imaged subject positioned in front of the lenses 17 to be imaged.

The vibration device 1 includes a casing member 2 and a buckling tuning fork vibrator 9. The buckling tuning fork vibrator 9 includes a first vibration element 5A, a second vibration element 5B, and a support body 4.

As illustrated in FIG. 1 and FIG. 2, in the present preferred embodiment, the casing member 2 preferably has a cylindrical tube shape. The casing member 2 may have another shape, such a polygonal tube shape, for example. The casing member 2 is preferably made of, for example, metal or synthetic resin.

The lower end of the casing member 2 is fixed to the base plate 3. The casing member 2 and the base plate 3 may be integral with one another.

The support body 4 is joined to the upper end of the casing member 2. The support body 4 preferably has a planar shape, such as an annular ring, and includes a first principal surface 4d as one principal surface and includes a second principal surface 4e as another principal surface. The support body 4 includes a through hole that penetrates so as to open at the first principal surface 4d and the second principal surface 4e, and is positioned in the center or approximate center of the first principal surface 4d and the second principal surface 4e. On the upper side of the above-described through hole in the first principal surface 4d, an extension portion 4a extends therefrom. On the lower side of the above-described through hole in the second principal surface 4e, an extension portion 4b extends therefrom. The support body 4 supports the outside edges of the first vibration element 5A and the second vibration element 5B, which are described below. The support body 4 is preferably made of, for example, metal, synthetic resin, or a ceramic material.

The first vibration element 5A preferably having a circular plate shape, for example, is joined to the upper end of the extension portion 4a of the support body 4. The first vibration element 5A includes a first vibration body 5A1 preferably having a circular plate shape, for example. The first vibration body 5A1 is translucent. A first piezoelectric vibrator 5A2 preferably having an annular ring shape, for example, is provided on the first vibration body 5A1 and on the side opposite the side on which the support body 4 is. The first piezoelectric vibrator 5A2 is excited by applying an alternating voltage to the first piezoelectric vibrator 5A2. Accordingly, the first vibration body 5A1 vibrates. The first vibration body 5A1 is preferably made of a translucent material, such as glass or synthetic resin, for example.

The second vibration element 5B is joined to the lower end of the extension portion 4b of the support body 4. The second vibration element 5B is provided so as to face the first vibration element 5A. The second vibration element 5B includes a second vibration body 5B1. The second vibration body 5B1 preferably has a planar shape, such as an annular ring and includes a cavity, for example. The second vibration body 5B1 includes an extension portion 5B1*b* that extends from the cavity to the side opposite the side on which the first vibration element 5A is. A second piezoelectric vibrator 5B2 preferably having an annular ring shape, for example, is provided on the second vibration body 5B1 and on the side opposite the side on which the first vibration element 5A is. The second piezoelectric vibrator 5B2 is provided so as to surround the extension portion 5B1*b*. The second piezoelectric vibrator 5B2 is excited by applying an alternating voltage to the second piezoelectric vibrator 5B2. Accordingly, the second vibration body 5B1 vibrates.

In the present preferred embodiment, the second vibration body 5B1 is preferably translucent. The second vibration body 5B1 is preferably made of a translucent material, such as glass or synthetic resin, for example. The second vibration body 5B1 may not be translucent. The planar shapes of the first vibration element 5A, the second vibration element 5B, and the support body 4 may each be replaced by a shape different from a circular shape, which may be a rectangular shape, for example. The support body 4 may have a tubular shape, such as a cylindrical tube shape or a polygonal tube shape, for example.

The support body 4 is arranged between the first vibration element 5A and the second vibration element 5B, and joins the first vibration element 5A and the second vibration element 5B. Consequently, the buckling tuning fork vibrator 9 is provided. Although the details are described below, the support body 4 is positioned in a node of the vibration of the buckling tuning fork vibrator 9. That is, the support body 4 supports the first vibration element 5A and the second vibration element 5B in a node of the vibration of the first vibration element 5A and the second vibration element 5B.

As illustrated in FIG. 1, in the vibration device 1, the casing member 2, the support body 4, and the first vibration element 5A define an accommodation space A. The accommodation space A is defined by being closed with the base plate 3 and is hermetically sealed. In the accommodation space A, the lens module 16 and the camera body 12 with the imaging element are accommodated.

In front of the lens 17 in the most forward position in front of the camera body 12, the first vibration element 5A is positioned. The first vibration element 5A is preferably the lens cover of the camera 10. The camera body 12 images an outer side portion of the first vibration body 5A1 that is preferably translucent. The first vibration element 5A is vibrated as described above, and water droplets that adhere to the first vibration element 5A and other matter are removed by being atomized or moved. As a result, the visibility of the camera body 12 is improved.

A feature of the camera 10 according to the present preferred embodiment is that the support body 4 supports the first vibration element 5A and the second vibration element 5B in the node of the vibration of the first vibration element 5A and the second vibration element 5B.

A portion at which the support body 4 is joined to the casing member 2 is referred to as a joint portion 4*c*. At this time, since the support body 4 is positioned in the above-described node of the vibration, the joint portion 4*c* hardly vibrates. So, even when the amplitude of the vibration for removing water droplets and other matter is increased, the sealability of the accommodation space A is effectively improved. Thus, the reliability of the camera body 12 is improved. Moreover, even when the support body 4 is joined to the casing member 2, the vibration of the first vibration element 5A and the second vibration element 5B is unlikely to be reduced or prevented. As a result, water droplets that adhere to the first vibration element 5A and other matter are able to be effectively removed.

Described below are the details of the above-described buckling tuning fork vibrator 9 including the first vibration element 5A, the second vibration element 5B, and the support body 4.

The buckling tuning fork vibration is vibration at which a mode appears, in which when two vibration elements (the first vibration element 5A and the second vibration element 5B) with approximate identical natural resonant frequencies are coupled, mutual resonance and antisymmetric vibration are caused.

In the present preferred embodiment, the natural resonant frequencies of the first vibration element 5A and the second vibration element 5B are identical or substantially identical. The natural resonant frequencies of the first vibration element 5A and the second vibration element 5B may be caused to agree by adjusting the thicknesses, sizes, and other parameters of the first vibration element 5A and the second vibration element 5B. The vibration modes of the first vibration element 5A and the second vibration element 5B are mutually antisymmetric.

Figure 3A:
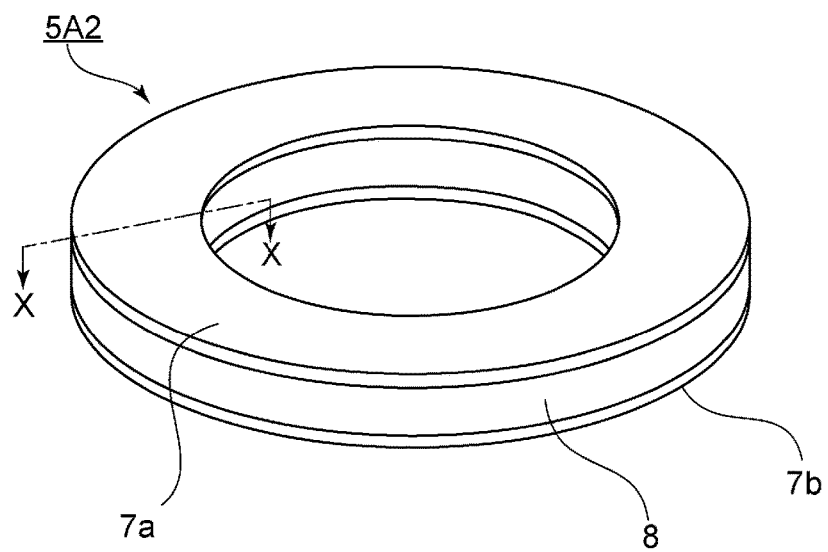
FIGS. 3A and 3B are perspective views of a first piezoelectric vibrator used in the first preferred embodiment of the present invention and a cross-sectional view along line X-X in FIG. 3A.
Figure 3B:
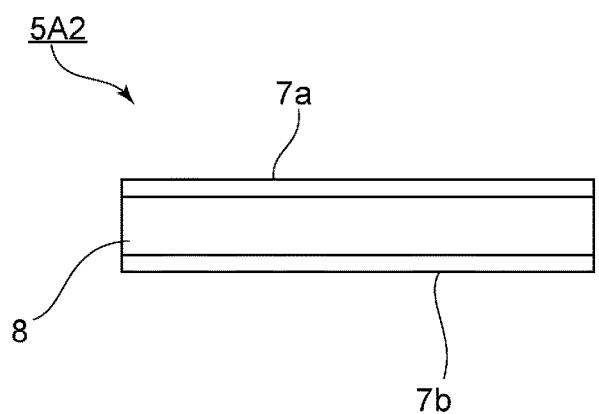

As illustrated in FIGS. 3A and 3B, the first piezoelectric vibrator 5A2 includes a piezoelectric body layer 8. The piezoelectric body layer 8 has a polarization axis direction. The polarization axis direction is a direction parallel or substantially parallel to a thickness direction of the piezoelectric body layer 8. The piezoelectric body layer 8 may preferably be made from suitable piezoelectric ceramics, such as $Pb(Zr,Ti)O_3$ or $(K,Na)NbO_3$, for example. As another example, the piezoelectric body layer 8 may be made from piezoelectric monocrystal, such as $LiTaO_3$ or $LiNbO_3$.

An electrode 7*a* is provided on the entire or substantially the entire upper surface of the piezoelectric body layer 8. An electrode 7*b* is provided on the entire or substantially the entire lower surface of the piezoelectric body layer 8. The electrodes 7*a* and 7*b* are each defined by, for example, a multilayer body in which a NiCr layer, a NiCu layer, and an Ag layer are sequentially laminated from the side of the piezoelectric body layer 8. The materials for the electrodes 7*a* and 7*b* are not particularly limited. The electrodes 7*a* and 7*b* may each be made of a metal layer that is a single layer.

Referring to FIG. 1, the second piezoelectric vibrator 5B2 has a structure that is the same or similar to that of the first piezoelectric vibrator 5A2. In the present preferred embodiment, preferably, the polarization axis directions of the first piezoelectric vibrator 5A2 and the second piezoelectric vibrator 5B2 are the same directions. The first piezoelectric vibrator 5A2 and the second piezoelectric vibrator 5B2 are excited with mutually opposite phases by applying alternating voltages with mutually opposite phases to the first piezoelectric vibrator 5A2 and the second piezoelectric vibrator 5B2. Thus, the first piezoelectric vibrator 5A2 and the second piezoelectric vibrator 5B2 are configured to vibrate with opposite phases.

The polarization axis directions of the first piezoelectric vibrator 5A2 and the second piezoelectric vibrator 5B2 may be mutually opposite directions. In this case, the first piezoelectric vibrator 5A2 and the second piezoelectric vibrator 5B2 are excited with mutually opposite phases by applying alternating voltages with the same phases to the first piezoelectric vibrator 5A2 and the second piezoelectric vibrator 5B2.

Figure 4:
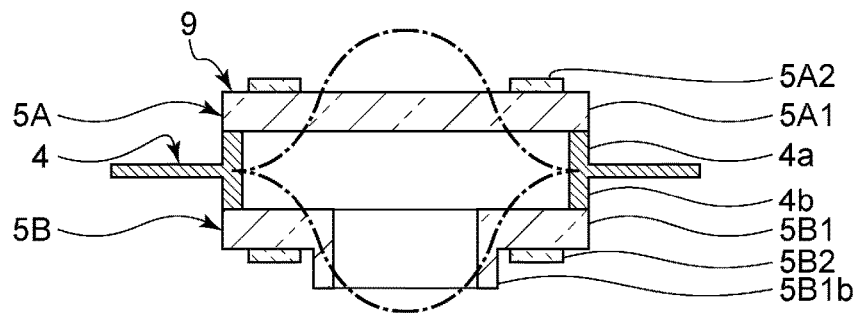
FIG. 4 is a schematic cross-sectional view that illustrates a vibration state of a first vibration element and a second vibration element according to the first preferred embodiment of the present invention.

FIG. 4 is a schematic cross-sectional view that illustrates a vibration state of the first vibration element and the second vibration element according to the first preferred embodiment. The alternate long and short dashed lines schematically indicate the vibration of the first vibration element and the second vibration element. FIG. 4 denotes the vibration in (0,0) mode, which is described below.

As illustrated in FIG. 4, the first vibration element 5A and the second vibration element 5B are structured to be excited with opposite phases at identical or substantially identical natural resonant frequencies. Consequently, a portion in which the support body 4 is provided defines and functions as the node of the vibration. The buckling tuning fork vibrator 9 is thus provided.

The natural resonant frequencies of the first vibration element 5A and the second vibration element 5B need not be exactly identical. The natural resonant frequencies of the first vibration element 5A and the second vibration element 5B may be substantially identical as long as the frequencies enable the first vibration element 5A and the second vibration element 5B to vibrate so that the portion in which the support body 4 is provided defines and functions as the node of the vibration.

As illustrated in FIG. 1, in the present preferred embodiment, the camera body 12 is positioned in the cavity of the second vibration element 5B. The lens 17 in the most forward position in front of the camera body 12 is positioned between the first vibration element 5A and the second vibration element 5B in the height direction. In the first vibration element 5A and the second vibration element 5B, only the first vibration element 5A is positioned in front of the camera body 12. Consequently, the visibility of the camera body 12 is outstanding. In addition, reduction in profile of the camera 10 is achieved.

As in the present preferred embodiment, it is preferable for the first piezoelectric vibrator 5A2 and the second piezoelectric vibrator 5B2 to be located farther on the side of each center or approximate center of the first vibration element 5A and the second vibration element 5B than the node of the vibration of the first vibration element 5A and the second vibration element 5B. In this case, the first vibration element 5A and the second vibration element 5B are able to be joined to the support body 4 in portions close to the outside edges of the first vibration element 5A and the second vibration element 5B. Consequently, the area of a portion that vibrates so as to remove water droplets and other matter in the vision of the camera 10 is increased, which is included in the total area of the first vibration element 5A. As a result, water droplets and other matter are efficiently and effectively removed.

It is more preferable that the node of the vibration of the first vibration element 5A is positioned on the outside edge of the first vibration element 5A and the support body 4 is joined to the outside edge. Thus, outward propagation of the vibration in the portion of the first vibration element 5A at which the support body 4 is joined in a plan view is not produced. Consequently, the first vibration element 5A is able to be even more efficiently vibrated and water droplets and other matter are more efficiently and effectively removed.

More preferably, the node of the vibration of the first vibration element 5A and the second vibration element 5B is positioned on the outside edges of the first vibration element 5A and the second vibration element 5B and the support body 4 is joined to the outside edges of the first vibration element 5A and the second vibration element 5B. Consequently, in addition to the above-described effect, size reduction of the camera 10 is achieved.

As in the present preferred embodiment, it is preferable that the casing member 2 and the second vibration element 5B are provided with a gap interposed therebetween. Consequently, the vibration of the second vibration element 5B is unlikely to be reduced or prevented.

Figure 5:
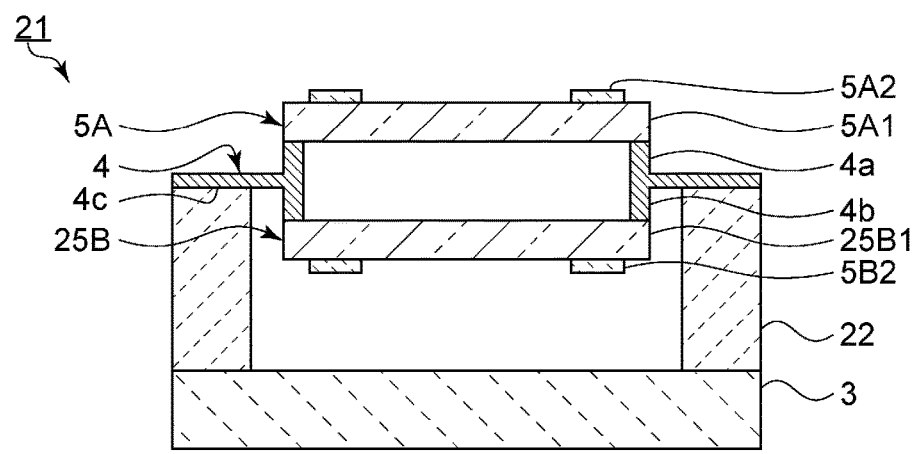
FIG. 5 is a front cross-sectional view of a vibration device according to a second preferred embodiment of the present invention.

FIG. 5 is a front cross-sectional view of a vibration device according to a second preferred embodiment of the present invention.

A vibration device 21 is different from the vibration device 1 according to the first preferred embodiment in that a second vibration body 25B1 preferably has a circular plate shape. In the points except what is described above, the vibration device 21 has a structure the same as or similar to that of the vibration device 1 according to the first preferred embodiment.

Also in the present preferred embodiment, similar to the first preferred embodiment, the reliability of the camera body is improved and water droplets and other matter that adhere to a first vibration element 5A are efficiently and effectively removed.

A first vibration body 5A1 and the second vibration body 25B1 each preferably have a circular plate shape and no complicated shapes. Thus, the natural resonant frequencies of the first vibration element 5A and a second vibration element 25B is able to be made identical more easily.

In the vibration device 21, the first vibration element 5A and the second vibration element 25B preferably have identical or substantially identical shapes. As a result, productivity is improved.

Figure 6:
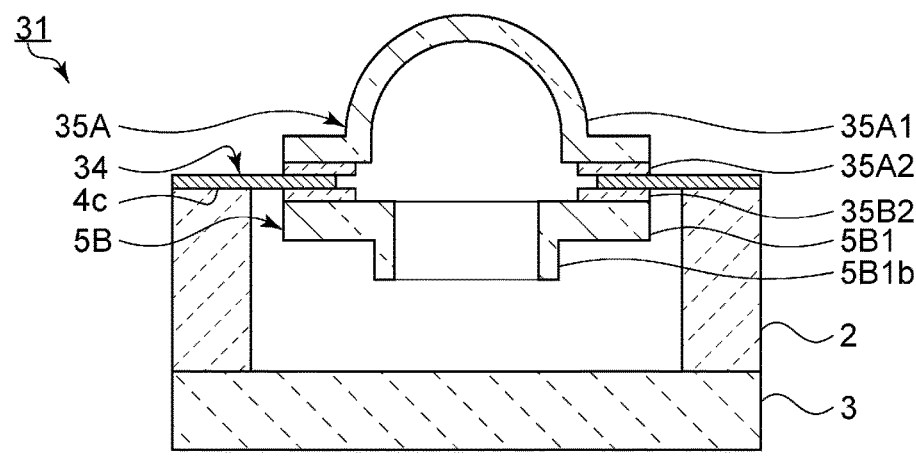
FIG. 6 is a front cross-sectional view of a vibration device according to a third preferred embodiment of the present invention.

FIG. 6 is a front cross-sectional view of a vibration device according to a third preferred embodiment of the present invention.

A vibration device 31 is different from the vibration device 1 according to the first preferred embodiment in that a first vibration body 35A1 preferably has a dome shape and a support body 34 does not include extension portions that extend upward and downward. The arrangements of a first piezoelectric vibrator 35A2 and a second piezoelectric vibrator 35B2 are also different from those according to the first preferred embodiment. In the points except what is described above, the vibration device 31 has a structure that is the same or similar to that of the vibration device 1 according to the first preferred embodiment.

The first vibration body 35A1 and a second vibration body 5B1 are structured so that the natural resonant frequencies of the first vibration element 35A and a second vibration element 5B are identical or substantially identical. The first piezoelectric vibrator 35A2 is provided on the side of the support body 34 of the first vibration element 35A. The second piezoelectric vibrator 35B2 is also provided on the side of the support body 34 of the second vibration element 5B. The first piezoelectric vibrator 35A2 and the second piezoelectric vibrator 35B2 are partially in contact with the support body 34. Specifically, the outside edges of the first piezoelectric vibrator 35A2 and the second piezoelectric vibrator 35B2 are supported by the support body 34 while the inside edges thereof are not supported by the support body 34. In the present preferred embodiment, the polarization axis directions of the first piezoelectric vibrator 35A2 and the second piezoelectric vibrator 35B2 are mutually opposite directions.

The support body 34 is preferably made of suitable metal. The support body 34 defines and functions as an outer electrode that electrically connects the first piezoelectric vibrator 35A2 and the second piezoelectric vibrator 35B2 to the outside. Thus, in the vibration device 31, alternating voltages with the same phases are applied to the first piezoelectric vibrator 35A2 and the second piezoelectric vibrator 35B2. Since the polarization axis directions of the first piezoelectric vibrator 35A2 and the second piezoelectric vibrator 35B2 are mutually opposite directions, the first piezoelectric vibrator 35A2 and the second piezoelectric vibrator 35B2 vibrate with mutually opposite phases.

Also in the present preferred embodiment, the first vibration element 35A and the second vibration element 5B vibrate so that the portion in which the support body 34 is provided defines and functions as the node of the vibration. Thus, the sealability in the vibration device 31 is improved and the reliability of the camera body is improved. Further, water droplets and other matter that adhere to the first vibration element 35A are efficiently and effectively removed.

The support body 34 may preferably be made of an insulator and electrodes may be provided on a first principal surface and a second principal surface of the support body 34. An electrode on the first principal surface of the support body 34 may be connected to an electrode of the first piezoelectric vibrator 35A2 and an electrode on the second principal surface of the support body 34 may be connected to an electrode of the second piezoelectric vibrator 35B2. In this case, the polarization axis directions of the first piezoelectric vibrator 35A2 and the second piezoelectric vibrator 35B2 may be the same directions or may be mutually opposite directions.

The first to third preferred embodiments are examples in each of which the number of vibration regions of the first vibration element is one. Described below is an example in which the first vibration element includes a plurality of vibration regions.

Vibration modes of the first vibration element are now described by referring to FIGS. 7A to 7D mentioned below.

Figure 7A:
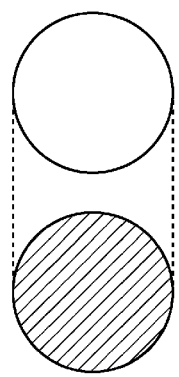
FIGS. 7A to 7D are schematic diagrams for describing vibration modes of the first vibration element and the second vibration element.

FIGS. 7A to 7D are schematic diagrams for describing the vibration modes of the first vibration element and the second vibration element. In FIG. 7A, the upper one illustrates the vibration in a case in which the first vibration element is viewed as a plane while the lower one illustrates the vibration in a case in which the second vibration element is viewed as a plane. The similar description applies to FIG. 7B to 7D.

In FIGS. 7A to 7D, the regions with the oblique hatch lines and the solid-white regions are displaced with opposite phases. Thus, the first vibration element and the second vibration element are displaced with opposite phases. In FIGS. 7A to 7D, the outermost edges and the boundaries between the solid-white regions and the regions with the oblique hatch lines define the nodes of the vibration. For example, in the vibration illustrated in FIG. 7B, the outside edge of the solid-white circle and the outside edge of the circle with the oblique hatch lines define the node of the vibration.

Figure 7B:
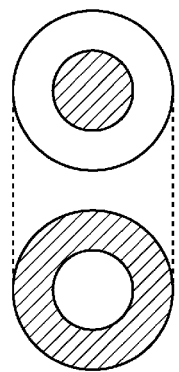
Figure 7C:
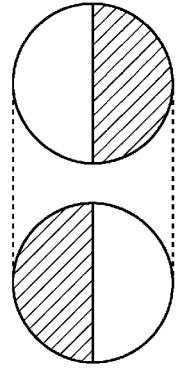
Figure 7D:
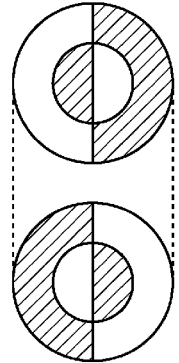

As schematically illustrated in FIGS. 7A to 7D, the mechanical resonant mode of the circular member may be denoted as (m,n) mode. Here, m represents the number of lines of the node present in a radial direction while n represents the number of lines of the node present in a circumferential direction. Each of m and n is an integer. Thus, the vibration mode illustrated in FIG. 7A is (0,0) mode, that in FIG. 7B is (1,0) mode, that in FIG. 7C is (0,1) mode, and that in FIG. 7D is (1,1) mode. In addition, a higher-order vibration mode where m is 2 or more and n is 2 or more may also be used.

In a fourth preferred embodiment of the present invention described below, a structure is provided in which a first vibration element and a second vibration element are able to vibrate in the above-described vibration modes.

Figure 8:
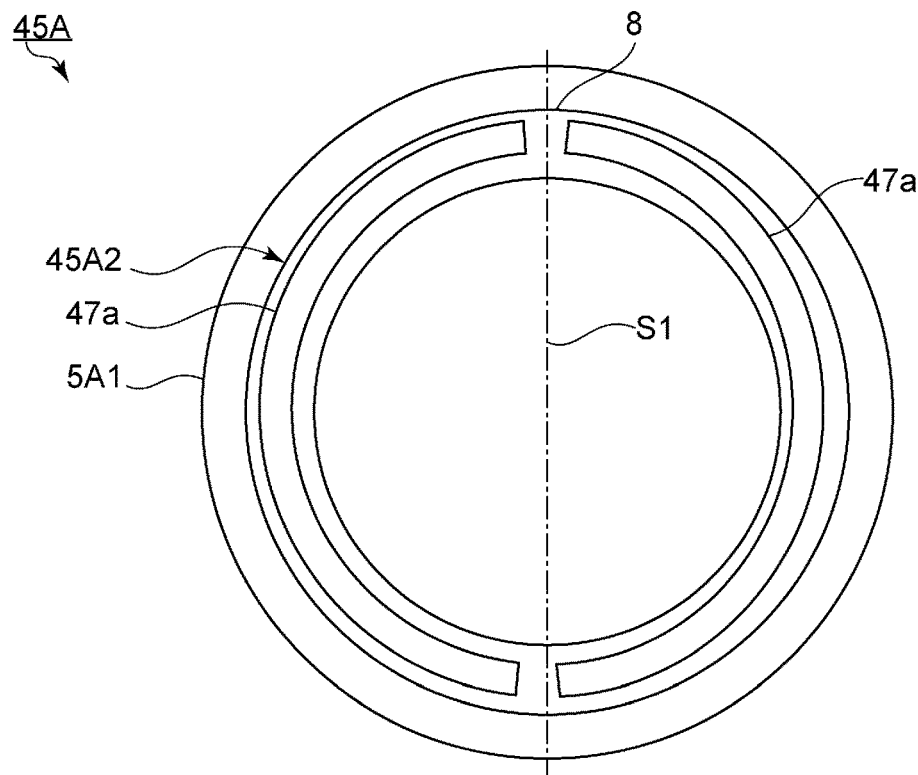
FIG. 8 is a plan view of a first vibration element according to a fourth preferred embodiment of the present invention.

FIG. 8 is a plan view of the first vibration element according to the fourth preferred embodiment.

A vibration device according to the fourth preferred embodiment is different from that according to the first preferred embodiment in that a plurality of electrodes 47a are provided on the upper surface of a piezoelectric body layer 8 of a first piezoelectric vibrator 45A2. The vibration device according to the fourth preferred embodiment is also different from that according to the first preferred embodiment in that a plurality of electrodes are respectively provided on the lower surface of the piezoelectric body layer 8 of the first piezoelectric vibrator 45A2 and on the upper surface and the lower surface of the piezoelectric body layer of a second piezoelectric vibrator. In the points except what is described above, the vibration device according to the fourth preferred embodiment has a structure the same as or similar to that of the vibration device 1 according to the first preferred embodiment.

More specifically, as illustrated in FIG. 8, the first vibration element 45A includes two adjacent regions with a center line S1 interposed therebetween. On the upper surface of the piezoelectric body layer 8, the electrode 47a is provided in each of a region on one side and a region on the other side with the center line S1 interposed therebetween. Similarly, also on the lower surface of the piezoelectric body layer 8, a plurality of electrodes are provided. Here, in any region, the polarization axis direction of the piezoelectric body layer 8 according to the present preferred embodiment is the same direction. At this time, when alternating voltages with opposite phases are applied to regions that are adjacent with the center line S1 interposed therebetween, the adjacent regions vibrate with mutually opposite phases.

In the present preferred embodiment, in the first vibration element 45A, (0,1) mode, (1,1) mode, or the like is excited. Thus, the first vibration element 45A is structured so that vibration regions adjacent in a plurality of vibration regions vibrate with opposite phases. When (0,1) mode or (1,1) mode is used, water droplets and other matter are removed by being moved from the node of the vibration to the antinode of the vibration and then being atomized. Since in each of FIG. 7C and FIG. 7D, the central portion of the first vibration element 45A (the center line S1 in FIG. 8) defines and functions as the node of the vibration, water droplets and other matter move toward an outside edge portion of the first vibration element 45A. Thus, the vision of the central portion of the camera body is able to be made clearer.

The second vibration element according to the present preferred embodiment is also structured so as to have a natural resonant frequency identical or substantially identical to that of the first vibration element 45A. Consequently, the portion in which the above-described support body is provided defines the node of the vibration of the first vibration element 45A and the second vibration element.

The vibration modes of the first vibration element 45A and the second vibration element may be changed as desired by changing the frequency of the vibration. Consequently, a portion in the first vibration element 45A at which water droplets and other matter are atomized is able to be changed as desired.

Also in the present preferred embodiment, the sealability in the vibration device is improved and the reliability of the camera body is improved. In addition, water droplets and other matter that adhere to the first vibration element 45A are efficiently and effectively removed.

Figure 9:
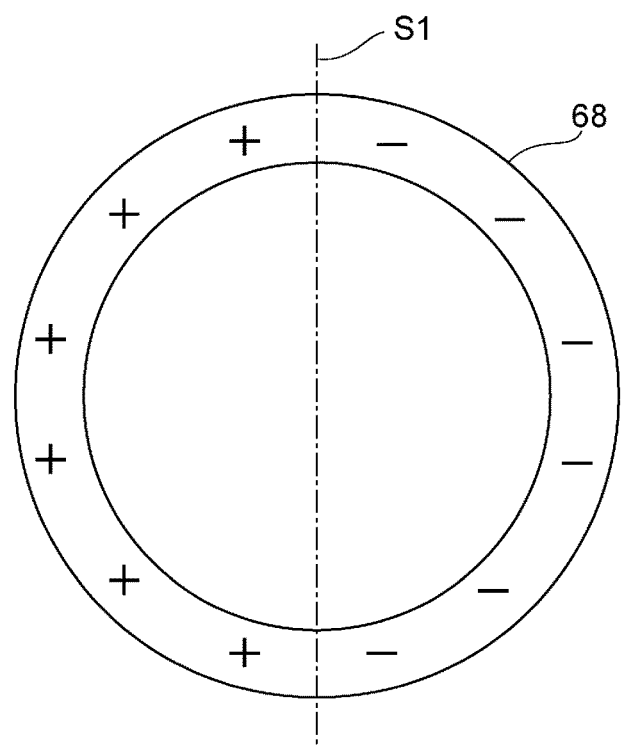
FIG. 9 is a schematic plan view of a piezoelectric body layer of a first piezoelectric vibrator according to a variation of the fourth preferred embodiment of the present invention.
Figure 10:
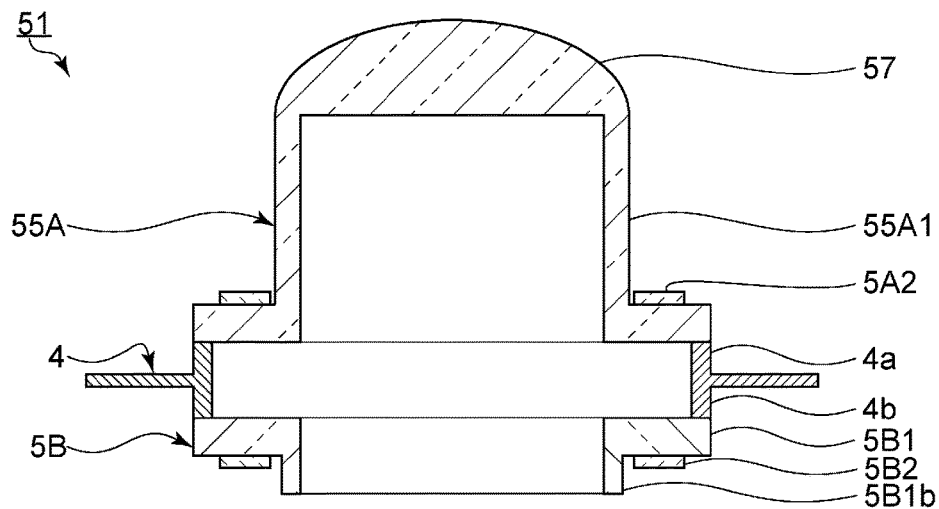
FIG. 10 is a front cross-sectional view of a vibration device of a camera according to a fifth preferred embodiment of the present invention.

As described above, to excite the vibration in (m,n) mode in the first vibration element 45A, the polarization directions of adjacent regions in the first piezoelectric vibrator 45A2 having an annular ring shape may be caused to be mutually opposite directions. For example, polarization may be performed as in a piezoelectric body layer 68 of the first piezoelectric vibrator according to a variation of the fourth preferred embodiment illustrated in FIG. 9. More specifically, the piezoelectric body layer 68 includes two regions that are adjacent with a center line S1 interposed therebetween, which passes through the center of the piezoelectric body layer 68 and extends in a radial direction. As illustrated with the symbols of + and −, the region on one side and the region on the other side with the center line S1 interposed therebetween may be polarized in mutually opposite directions in the thickness direction. In this case, electrodes may be provided on entire or substantially entire surfaces on both sides of the piezoelectric body layer 68. By applying alternating voltages from the electrodes on both sides, (0,1) mode, (1,1) mode, and other suitable modes may be excited.

Further, when as in the above-described variation, the polarization axis directions are mutually opposite directions and the number of adjacent regions is increased, n in the vibration mode may be caused to be a higher order. In this case, alternating voltages with the same phases may be applied to adjacent regions.

For another example, n in the vibration mode may be caused to be a higher order by increasing the number of electrodes provided in a circumferential direction of the piezoelectric body layer. In this case, alternating voltages with mutually opposite phases may be applied to adjacent electrodes.

When m is caused to be a higher order, for example, the frequency of the vibration may be increased.

Moreover, even when what adheres to the camera is a solution other than water, such as ethanol, an aqueous solution in which salt, an antifreezing agent (calcium chloride), or other material is dissolved, droplets containing impurities that do not dissolve in water, such as muddy water, or a colloid solution, such as coffee, (which are hereinafter referred to as droplets,) are able to be efficiently and effectively removed. Specifically, by suitably vibrating the first vibration element, droplets may be atomized while the content remains dissolved and the droplets that adhere to the outer surface of the first vibration element are able to be removed. The action at this time is different from evaporation and it is possible to remove droplets as a whole without precipitating what is dissolved and impurities in the droplets.

Effects of the removal of droplets are described in more detail by describing a first implementation example and a second implementation example presented below. Vibration devices in the first implementation example and the second implementation example correspond to the vibration device 1 according to the first preferred embodiment, which is illustrated in FIG. 1. The dimensions of a first piezoelectric vibrator 5A2, a second piezoelectric vibrator 5B2, a first vibration body 5A1, a second vibration body 5B1, and a support body 4 that were used in the first implementation example are indicated below.

As to the dimensions of each of the first piezoelectric vibrator 5A2 and the second piezoelectric vibrator 5B2, the inside diameter was about 12.0 mm, the outside diameter was about 18.0 mm, and the thickness was about 0.5 mm. As to the dimensions of the first vibration body 5A1, the outside diameter was about 18.0 mm and the thickness was about 0.7 mm. As to the dimensions of the second vibration body 5B1, the outside diameter was about 18.0 mm, the thickness was about 0.7 mm, and the opening diameter was about 14.0 mm. As to the dimensions of an extension portion 5B1*b* of the second vibration body 5B1, the outside diameter was about 16.0 mm, the inside diameter was about 14.0 mm, and the thickness was about 2.29 mm. As to the dimensions of the support body 4, the inside diameter was about 16.0 mm, the outside diameter was about 22.0 mm, and the thickness was about 0.1 mm.

In the first implementation example, operation was performed by dropping a saline solution of approximately 0.4% (an aqueous solution where about 14 g of NaCl was dissolved in about 1 L of water) onto the first vibration element 5A by a small amount to atomize the solution continuously. Specifically, the saline solution was dropped by about 15 ml an hour. Also in this case, the aqueous solution could be removed without precipitating NaCl included in the saline solution.

Similarly, also in cases of a colloid solution, such as coffee, and a solution except water, such as ethanol, the solution that had adhered to the outer surface of the first vibration element 45A was able to be removed without precipitating the content on the first vibration element 5A.

Moreover, also in a case of droplets containing impurities that do not dissolve in water, such as mud, by placing the present device in a suitable direction (downward), water droplets including the impurities that do not dissolve in water were able to be atomized as a whole and the water droplets that had adhered to the outer surface of the first vibration element 5A were able to be removed. When the amount of the impurities was large or the particle diameters of the impurities were large, some impurities remained on the first vibration element 5A but the region at which the impurities remained was spaced away from the central portion of the first vibration element 45A. In addition, the residues fell because of the self weight and the vibration caused in the first vibration element 5A. Thus, even when impurities remain temporarily, the possibility of making the vision of the camera body 12 unclear is small.

The results of the second implementation example are indicated below. The dimensions of piezoelectric vibrators 5A2 and 5B2, a first vibration body 5A1, a second vibration body 5B1, and a support body 4 that were used in the second implementation example are the same or substantially the same as the respective dimensions that were used in the first implementation example.

When operation was performed by arranging the present device in a direction tilted downward by about 45° from the horizontal direction and dropping droplets, where about 10 g of typical soil was dispersed in about 90 ml of water, onto the first vibration element 5A by a small amount (in this case, about 15 ml an hour dropped) to atomize the droplets continuously, impurities having a small particle diameter were atomized together with the water and were able to be removed from the outer surface of the first vibration element 5A. Although some impurities having a large particle diameter remained on the first vibration element 5A, the region at which the impurities remained was spaced away from the central portion of the first vibration element 5A. The impurities that had remained fell because of the self weight and the vibration and were removed from the outer surface of the first vibration element 5A.

FIG. 10 is a cross-sectional view of a vibration device of a camera according to a fifth preferred embodiment of the present invention.

The camera according to the present preferred embodiment is different from that according to the first preferred embodiment in that a vibration device 51 is a lens module of the camera body. Similar to the first preferred embodiment, the camera according to the present preferred embodiment includes an imaging portion that includes an imaging element.

A first vibration element 55A includes a first vibration body 55A1 and a first piezoelectric vibrator 5A2 provided on the first vibration body 55A1. The first vibration body 55A1 includes a lens 57. The lens 57 is arranged in the most forward position in front of the camera.

A second vibration element 5B has a structure similar to that of the second vibration element 5B according to the first preferred embodiment. The second vibration element 5B is joined to a support body 4. The first vibration element 55A is also joined to the support body 4. Also in the present preferred embodiment, the support body 4 supports the first vibration element 55A and the second vibration element 5B in the node of the vibration of the first vibration element 55A and the second vibration element 5B. The camera according to the present preferred embodiment includes a cabinet portion in which the above-described imaging portion is accommodated, which is not illustrated. The support body 4 is joined to the cabinet portion of the camera. The cabinet portion, the support body 4, and the first vibration element 55A define a hollow space. In the hollow space, the above-described imaging portion is provided.

In the present preferred embodiment, the sealability of the above-described hollow space of the camera is improved and the reliability of the camera is improved. Further, water droplets and other matter that adhere to the outer surface of the lens 57 are efficiently and effectively removed.

Figure 11:
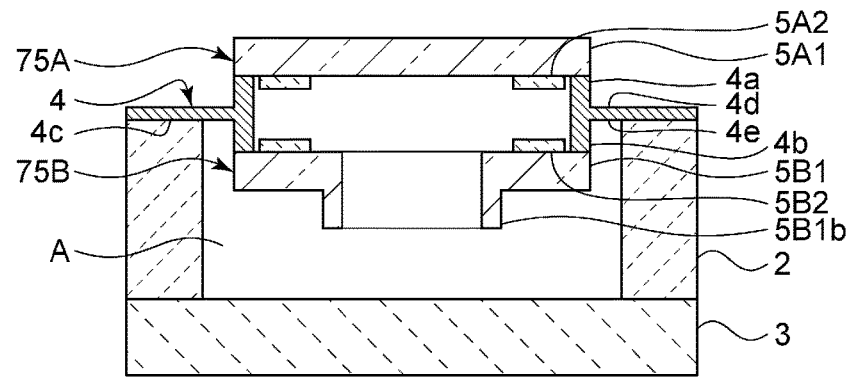
FIG. 11 is a front cross-sectional view of a vibration device of a camera according to a first variation of the first preferred embodiment of the present invention.

FIG. 11 illustrates a first variation of the first preferred embodiment of the present invention. Similar to a first vibration element 75A, the first piezoelectric vibrator 5A2 may be provided on the lower side of the first vibration body 5A1. Similar to a second vibration element 75B, the second piezoelectric vibrator 5B2 may also be provided on the upper side of the second vibration body 5B1. In this case, the first piezoelectric vibrator 5A2 and the second piezoelectric vibrator 5B2 are provided in the accommodation space A. Thus, the first piezoelectric vibrator 5A2 and the second piezoelectric vibrator 5B2 are prevented from coming into contact with water droplets or other matter. Thus, the reliability of the vibration device is further improved.

Figure 12:
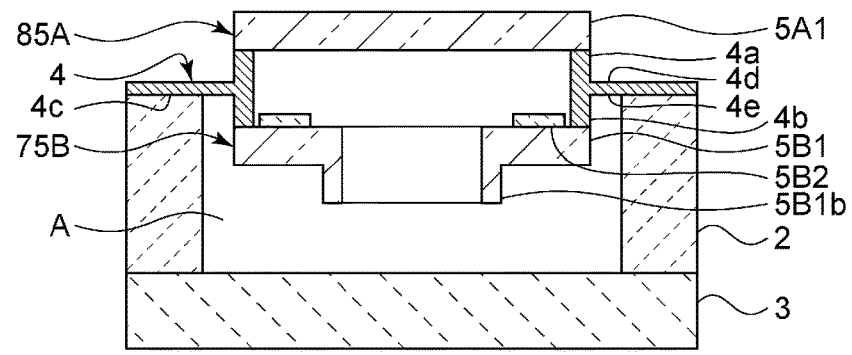
FIG. 12 is a front cross-sectional view of a vibration device of a camera according to a second variation of the first preferred embodiment of the present invention.

FIG. 12 illustrates a second variation of the first preferred embodiment of the present invention. A vibration device according to the second variation is different from that according to the first variation in that the first piezoelectric vibrator is not included. In the second variation, it is preferable for the first vibration element 5A and the second vibration element 5B to be excited with opposite phases at identical or substantially identical natural resonant frequencies. In this case, a first vibration element 85A and a second vibration element 75B according to the second variation are able to be sufficiently vibrated. Consequently, similar to the first preferred embodiment, the reliability of the camera body is improved, and water droplets and other matter that adhere to the first vibration element 85A are efficiently and effectively removed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
a support body that includes one principal surface and another principal surface, a through hole penetrating through the support body to open at the one principal surface and the another principal surface;
a first vibration element located on a side of the one principal surface of the support body; and
a second vibration element located on a side of the another principal surface of the support body; wherein
the first vibration element includes a first vibration body that is translucent;
the second vibration element including a second vibration body and a piezoelectric vibrator provided on the second vibration body;
the first vibration element includes a first piezoelectric vibrator provided on the first vibration body and the piezoelectric vibrator of the second vibration element is a second piezoelectric vibrator; and
the first piezoelectric vibrator and the second piezoelectric vibrator vibrate with mutually opposite phases.

2. The vibration device according to claim 1, wherein the support body supports the first vibration element and the second vibration element at a node of vibration of the first vibration element and the second vibration element.

3. The vibration device according to claim 1, wherein the support body supports the first vibration element and the second vibration element at outside edges of the first vibration element and the second vibration element.

4. The vibration device according to claim 1, wherein the support body has a tubular shape.

5. The vibration device according to claim 1, wherein the first vibration element includes a plurality of vibration regions, and adjacent vibration regions in the plurality of vibration regions vibrate with opposite phases.

6. The vibration device according to claim 1, wherein the first vibration body has a plate shape.

7. The vibration device according to claim 1, wherein the first vibration body has a dome shape.

8. The vibration device according to claim 1, wherein the second vibration body is translucent and has a plate shape.

9. The vibration device according to claim 1, wherein the second vibration body includes a cavity and an extension portion that extends from the cavity to a side opposite a side on which the first vibration element is provided.

10. The vibration device according to claim 1, further comprising:
a casing member connected to the support body; wherein
the first vibration element, the support body, and the casing member define an accommodation space.

11. A camera comprising:
the vibration device according to claim 10;
a lens module accommodated in the accommodation space; and
an imaging element accommodated in the accommodation space.

12. A camera comprising:
a lens module including the vibration device according to claim 1 and a lens; and
an imaging element; wherein
at least one of the first vibration element and the second vibration element of the vibration device including the lens.

13. The camera according to claim 12, wherein the support body supports the first vibration element and the second vibration element in a node of vibration of the first vibration element and the second vibration element.

14. The camera according to claim 12, wherein the support body supports the first vibration element and the second vibration element on outside edges of the first vibration element and the second vibration element.

15. The camera according to claim 12, wherein the support body has a tubular shape.

16. The camera according to claim 12, wherein the first vibration element includes a plurality of vibration regions, and adjacent vibration regions in the plurality of vibration regions vibrate with opposite phases.

17. The camera according to claim 12, wherein the first vibration body has a plate shape.

18. The camera according to claim 12, wherein the first vibration body has a dome shape.

* * * * *